(12) United States Patent
Eng et al.

(10) Patent No.: US 12,248,464 B2
(45) Date of Patent: Mar. 11, 2025

(54) QUERY EXECUTION DEBUGGER FOR USE WITH BUSINESS INTELLIGENCE AND DATA ANALYTICS ENVIRONMENTS

(71) Applicant: Oracle International Corporation, Redwood Shores, CA (US)

(72) Inventors: Kenneth Eng, Redwood City, CA (US); Praful Hebbar, Bangalore (IN); Gilberto Monroy, Atizapán (MX)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/395,816

(22) Filed: Aug. 6, 2021

(65) Prior Publication Data

US 2022/0138189 A1 May 5, 2022

Related U.S. Application Data

(60) Provisional application No. 63/108,152, filed on Oct. 30, 2020.

(51) Int. Cl.
*G06F 16/242* (2019.01)
*G06Q 10/067* (2023.01)

(52) U.S. Cl.
CPC ....... *G06F 16/2448* (2019.01); *G06Q 10/067* (2013.01)

(58) Field of Classification Search
CPC .......................... G06F 16/2448; G06Q 10/067
See application file for complete search history.

(56) References Cited

U.S. PATENT DOCUMENTS 9,779,133 B2 * 10/2017 Bhagavan ............. G06F 16/245
9,823,995 B2 * 11/2017 Menahem ........... G06F 11/3664
(Continued)

FOREIGN PATENT DOCUMENTS

EP 2990951 3/2016

OTHER PUBLICATIONS

European Patent Office, International Searching Authority, International Search Report and Written Opinion dated Feb. 14, 2022 for International Application No. PCT/US2021/57077, 11 pages.
(Continued)

*Primary Examiner* — Khanh B Pham
*Assistant Examiner* — Ranjit P Doraiswamy
(74) *Attorney, Agent, or Firm* — TUCKER ELLIS LLP

(57) ABSTRACT

In accordance with an embodiment, described herein is a query execution debugger, for use with a computing environment such as, for example, a business intelligence environment, database, data warehouse, or other type of environment that supports data analytics. A query engine, for example a business intelligence server instance, serves analytics queries or requests from clients, directed to data stored at a database, in accordance with a query execution plan, wherein a logical query can include query language statements received from the clients; while a physical query includes database-specific statements that the query engine sends to the database to retrieve data when processing the logical query. The system can create a query execution debugger file that includes a record metadata portion or section, and a data portion or section, and which can be used to review, simulate, or debug the processing of queries against the database.

20 Claims, 14 Drawing Sheets

(56) References Cited

U.S. PATENT DOCUMENTS

| | | |
|---|---|---|
| 2007/0112737 A1 | 5/2007 | Carlson |
| 2010/0251213 A1* | 9/2010 | Yamin ................. G06F 11/3624 717/124 |
| 2016/0147637 A1 | 5/2016 | Bhagavan |

OTHER PUBLICATIONS

Rittman, Mark, "Inside the Oracle BI Server Part 1: The BI Server Architecture", Feb. 25, 2010, retrieved May 17, 2021, from:<https://www.rittmanmead.com/blog/2010/02/inside-the-oracle-bi-server-part-1-the-bi-server-architecture/>.

Rittman, Mark, "Inside the Oracle BI Server Part 2: How is a Query Processed?", Mar. 1, 2010, retrieved May 17, 2021, from:<https://www.rittmanmead.com/blog/2010/03/inside-the-oracle-bi-server-part-2-how-is-a-query-processed/>.

Rittman, Mark, "Inside the Oracle BI Server Part 3: BI Server In-Memory Joins", Mar. 3, 2010, retrieved May 17, 2021, from:<https://www.rittmanmead.com/blog/2010/03/inside-the-oracle-bi-server-part-3-bi-server-in-memory-joins/>.

Unknown, "Geeks for Geeks; Tree Traversals (Inorder, Preorder and Postorder" 8 pages, retrieved on Oct. 26, 2020 from <https://www.geeksforgeeks.org/tree-traversals-inorder-preorder-and-postorder/>.

* cited by examiner

```
RqList <<1511>> [for database 0:0,0]
  D1.c1 as c1 [for database 0:0,0],
  sum(D1.c2 by [D1.c1]) as c2 [for database 0:0,0]
Child Nodes (RqJoinSpec): <<1523>> [for database 0:0,0]
  RqJoinNode <<1522>> []
    (
      RqList <<1501>> [for database 0:0,128]
        T2000001.rental_city_dictkey as c1 [for database 0:0,128],
        T2000001.total_bookings as c2 [for database 0:0,128]
      Child Nodes (RqJoinSpec): <<1510>> [for database 0:0,128]
        RqJoinNode <<1509>> []
        XC_INTERNAL_STORAGE.XC_BIKERENTALS_INPUT2950259205 T2000001
    ) as D1
GroupBy: [D1.c1] [for database 0:0,0] sort
OrderBy: c1, Aggs:[sum(D1.c2 by [D1.c1])] [for database 0:0,0]
```

*FIGURE 6*

```
RqList <<9722>> [for database 0:0,0] [1]
  D1.c1 as c1 [for database 0:0,0],
  D1.c2 as c2 [for database 0:0,0],
  D1.c3 as c3 [for database 0:0,0],
  D1.c4 as c4 [for database 0:0,0],
  D1.c5 as c5 [for database 0:0,0],
  D1.c6 as c6 [for database 0:0,0],
  D1.c7 as c7 [for database 0:0,0]
Child Nodes (RqJoinSpec): <<9741>> [for database 0:0,0]
  RqJoinNode <<9740>> []
    (
      Child Nodes (RqCache): 1594825038:105:1615788485:0x7f949888e7d0
        RqList <<8602>> [for database 0:0,0] [2]
          0 as c1 GB [for database 0:0,1],
          D106.c1 as c2 GB [for database 0:0,0],
          Dict_lookup(D106.c2, XC_INTERNAL_STORAGE.XC_CITYCABS_50MB_INPU462464504
          (Dictionary for vendor_id)) as c3 GB [for database 0:0,0],
          D106.c3 as c4 GB [for database 0:0,0],
          D106.c4 as c5 GB [for database 0:0,0],
          D106.c5 as c6 GB [for database 0:0,0],
          D106.c6 as c7 GB [for database 0:0,0],
          cast(NULL as VARCHAR (192)) as c8 [for database 0:0,1],
          cast(NULL as VARCHAR (192)) as c9 [for database 0:0,1]
        Child Nodes (RqJoinSpec): <<9534>> [for database 0:0,0]
          RqJoinNode <<9533>> []
            (
              RqList <<9465>> [for database 0:0,0] [3]
                D901.c1 as c1 GB [for database 0:0,0],
                D901.c2 as c2 GB [for database 0:0,0],
                coalesce(D901.c3 , D901.c4) as c3 GB [for database 0:0,0],
                sum(D901.c5 by [D901.c1, D901.c2, coalesce(D901.c3 , D901.c4)])
                  as c4 GB [for database 0:0,0],
                sum(D901.c6 by [D901.c1, D901.c2, coalesce(D901.c3 , D901.c4)])
                  as c5 GB [for database 0:0,0],
                sum(D901.c7 by [D901.c1, D901.c2, coalesce(D901.c3 , D901.c4)])
                  as c6 GB [for database 0:0,0]
              Child Nodes (RqJoinSpec): <<9760>> [for database 0:0,0]
                RqJoinNode <<9812>> []
                  (
                    RqList <<9770>> [for database 0:0,0] [4]
                      D102.c1 as c1 GB [for database 0:0,0],
                      D102.c2 as c2 GB [for database 0:0,0],
                      D101.c1 as c3 GB [for database 0:0,0],
                      D102.c3 as c4 GB [for database 0:0,0],
```

*FIGURE 7A*

```
        D102.c4 as c5 [for database 0:0,0],
        D102.c5 as c6 [for database 0:0,0],
        D102.c6 as c7 [for database 0:0,0]
   Child Nodes (RqJoinSpec): <<9773>> [for database 0:0,0]
      RqJoinNode <<9769>> []
      (
         RqList <<10383>> [for database 0:0,0] [6]
            Dict_lookup(D1.c9,
            XC_INTERNAL_STORAGE.XC_CITYCABS_50MB_INPU462464504
            Dictionary for hack_license)) as c3 [for database 0:0,0],
            D1.c1 as c1 [for database 0:0,0],
            D1.c2 as c2 [for database 0:0,0],
            D1.c4 as c4 [for database 0:0,0],
            D1.c5 as c5 [for database 0:0,0],
            D1.c6 as c6 [for database 0:0,0]
   Child Nodes (RqJoinSpec): <<10410>> [for database 0:0,0]
      RqJoinNode <<10409>> []
      (
         RqList <<10225>> [for database 0:0,0] [7]
            D901.c1 as c1 [for database 0:0,0],
            D901.c4 as c2 [for database 0:0,0],
            D901.c6 as c4 [for database 0:0,0],
            D901.c7 as c5 [for database 0:0,0],
            D901.c5 as c6 [for database 0:0,0],
            D901.c2 as c9 [for database 0:0,0]
...
```

FIGURE 7B

```
{
  "directory" : "<directory_path>"
    // Absolute directory path to read or write QED files.
      If unspecified, OBIS log directory will be used.
  "node-list" : // If unspecified or empty, logging will be enabled on all nodes.
  [
  {
    "node-id" : "<id>", // The deterministic ID of a RqList node.
      There may be other types of loggable nodes besides RqList.
    "read-spec" : // If specified, write-spec will be ignored.
    {
      "file" : "<QED file name>", // The file to read as an override.
        It is assumed to be located in the configured directory.
      "sub-operation" : "<name of sub-operation within the node to override>"
        // Required if there are multiple sub-operations in the node.
    },
    "write-spec" :
    {
      "data-format" : "<format of the logged data>",
        // If unspecified, CSV format is used.
      "include-col-length-prefix" : "<true/false>",
        // If true, variable length columns will be logged with their length
          prefix in the CSV. Default is false.
      "sub-operations" : [<array of sub-operation names to log>],
        // If unspecified or empty, all sub-operations will be logged.
      "columns" : [<array of column numbers to log>],
        // If unspecified, all columns will be logged.
          If empty, only metadata is logged.
      "data-filter" : [<array of filter conditions>]
        // If unspecified or empty, all rows will be logged.
    }
  },
  {
    // Spec for another node.
  }
  ]
}
```

*FIGURE 8*

```
SELECT
   Product.CategoryName as "Category Name",
   Sales.Revenue as "Revenue",
   Sales.PlanRevenue as "Plan Revenue"
FROM SalesSubjectArea
WHERE Sales.Revenue - Sales.PlanRevenue > 20000 ORDER BY 1
```

FIGURE 9

```
Oracle database SQL 1:

select T3075.CategoryName as c2,
       T3075.CategoryID as c3,
       sum(T3145.Revenue) as c1
from
       Categories T3075,
       Products T3122,
       Suppliers T3176,
       sales_prod_emp T3145
where (T3075.CategoryID = T3122.CategoryID and
       T3122.ProductID = T3145.ProductID and
       T3122.SupplierID = T3176.SupplierID)
group by T3075.CategoryID, T3075.CategoryName Oracle database SQL 2:

select T3075.CategoryName as c2,
       T3075.CategoryID as c3,
       sum(T3154.Revenue) as c1
from
       Categories T3075,
       SalesPlan T3154
where (T3075.CategoryID = T3154.CategoryID)
group by T3075.CategoryID, T3075.CategoryName
```

FIGURE 10

```
RqList <<38734>> [for database 0:0,0] [1]
  D1.c1 as c1 [for database 3023:3036:SQLDB_Northwind,46],
  D1.c2 as c2 [for database 3023:3036:SQLDB_Northwind,46],
  D1.c3 as c3 [for database 3023:3036:SQLDB_Northwind,46]
Child Nodes (RqJoinSpec): <<38747>> [for database 0:0,0]
  RqJoinNode <<38746>> []
    (
      RqBreakFilter <<38902>>[1,4] [for database 0:0,1] [2]
      RqList <<38790>> [for database 0:0,0] [3]
        coalesce(D1.c2 , D2.c2) as c1 GB
          [for database 3023:3036:SQLDB_Northwind,46],
        coalesce(D1.c3 , D2.c3) as c4 GB
          [for database 3023:3036:SQLDB_Northwind,46],
        D1.c1 as c2 GB [for database 3023:3036:SQLDB_Northwind,46],
        D2.c1 as c3 GB [for database 3023:3036:SQLDB_Northwind,46]
      Child Nodes (RqJoinSpec): <<38793>> [for database 0:0,0]
        RqJoinNode <<38789>> []
          (
            RqList <<38571>> [for database 3023:3036:SQLDB_Northwind,46] [5]
              Categories.CategoryName as c2 GB
                [for database 3023:3036:SQLDB_Northwind,46],
              Categories.CategoryID as c3 GB
                [for database 3023:3036:SQLDB_Northwind,46],
              sum(sales_prod_emp.Revenue by [Categories.CategoryID]) as c1 GB
                [for database 3023:3036:SQLDB_Northwind,46]
            Child Nodes (RqJoinSpec): <<38637>>
              [for database 3023:3036:SQLDB_Northwind,46]
              RqJoinNode <<38633>> [(InNode:<<38633>>) (OutNode:<<38634>>)]
                Categories T3075
              RqJoinNode <<38634>> [(InNode:<<38633>>) (OutNode:<<38634>>) ,
                (InNode:<<38634>>) (OutNode:<<38635>>) , (InNode:<<38634>>)
                (OutNode:<<38636>>)]
                Products T3122
              RqJoinNode <<38635>> [(InNode:<<38634>>) (OutNode:<<38635>>)]
                Suppliers T3176
              RqJoinNode <<38636>> [(InNode:<<38634>>) (OutNode:<<38636>>)]
                sales_prod_emp T3145
            DetailFilter: Categories.CategoryID = Products.CategoryID and
            Products.ProductID = sales_prod_emp.ProductID and
            Products.SupplierID = Suppliers.SupplierID
              [for database 3023:3036:SQLDB_Northwind,46]
            GroupBy: [Categories.CategoryID, Categories.CategoryName]
              [for database 3023:3036:SQLDB_Northwind,46]
          ) as D1 FullOuterStitchJoin (Eager) <<38722>> [4]
```

FIGURE 11A

```
        On D1.c2 = D2.c2 and D1.c3 = D2.c3; actual join vectors: [0 1] = [0 1]
        (
            RqList <<38646>> [for database 3023:3036:SQLDB_Northwind,46] [6]
              Categories.CategoryName as c2 GB
                [for database 3023:3036:SQLDB_Northwind,46],
              Categories.CategoryID as c3 GB
                [for database 3023:3036:SQLDB_Northwind,46],
              sum(SalesPlan.Revenue by [Categories.CategoryID]) as c1 GB
                [for database 3023:3036:SQLDB_Northwind,46]
            Child Nodes (RqJoinSpec): <<38683>>
              [for database 3023:3036:SQLDB_Northwind,46]
              RqJoinNode <<38681>> [(InNode:<<38681>>) (OutNode:<<38682>>)]
                Categories T3075
              RqJoinNode <<38682>> [(InNode:<<38681>>) (OutNode:<<38682>>)]
                SalesPlan T3154
            DetailFilter: Categories.CategoryID = SalesPlan.CategoryID
              [for database 3023:3036:SQLDB_Northwind,46]
            GroupBy: [Categories.CategoryID, Categories.CategoryName]
              [for database 3023:3036:SQLDB_Northwind,46]
        ) as D2
    DetailFilter: 20000 < D1.c1 - D2.c1 [for database 3023:3036:SQLDB_Northwind,46]
    OrderBy: c1 asc, c4 [for database 0:0,0]
) as D1
```

FIGURE 11B

```
{
  "consumeVariableLengthRecord": false,
  "produceVariableLengthRecord": false,
  "binaryRecordSize": 64,
  "textRecordSize": 62,
  "fieldCount": 3,
  "nullIndicatorCount": 3,
  "nullsOffset": 56,
  "isUnicodeCharacter": true,
  "fieldDescriptors": [
      {
        "dataTypeName": "VARCHAR",
        "fieldId": 0,
        "objectLength": 15,
        "byteOffset": 0,
        "nullOffset": 56,
        "textOffset": 0,
        "textLength": 15,
        "decimalPrecision": 2,
        "scale": 0
      },
      {
        "dataTypeName": "DOUBLE PRECISION",
        "fieldId": 1,
        "objectLength": 8,
        "byteOffset": 40,
        "nullOffset": 57,
        "textOffset": 16,
        "textLength": 22,
        "decimalPrecision": 2,
        "scale": 0
      },
      {
        "dataTypeName": "DOUBLE PRECISION",
        "fieldId": 2,
        "objectLength": 8,
        "byteOffset": 48,
        "nullOffset": 58,
        "textOffset": 39,
        "textLength": 22,
        "decimalPrecision": 2,
        "scale": 0
      }
  ]
}
Beverages,286526.95,257874.27
Dairy Products,251330.5,226197.45
```

*FIGURE 12*

QUERY EXECUTION DEBUGGER FOR USE WITH BUSINESS INTELLIGENCE AND DATA ANALYTICS ENVIRONMENTS

CLAIM OF PRIORITY

This application claims the benefit of priority to U.S. Provisional Patent application titled "QUERY EXECUTION DEBUGGER FOR USE WITH BUSINESS INTELLIGENCE AND DATA ANALYTICS ENVIRONMENTS", Application No. 63/108,152, filed Oct. 30, 2020; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, and computer-based methods of providing business intelligence or other data, and are particularly related to a system and method for providing a query execution debugger for use with such environments.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

With such environments, there may at times be an interest in reviewing the performance by which various queries, for example as may be received from data analytics clients, are processed or otherwise receive data from a database or a data warehouse. However, direct access to the database or the data may not be provided, for example if the database is located at a customer's site, or if access to the database is otherwise restricted.

SUMMARY

In accordance with an embodiment, described herein is a query execution debugger, for use with a computing environment such as, for example, a business intelligence environment, database, data warehouse, or other type of environment that supports data analytics. A query engine, for example a business intelligence server instance, serves analytics queries or requests from clients, directed to data stored at a database, in accordance with a query execution plan, wherein a logical query can include query language statements received from the clients; while a physical query includes database-specific statements that the query engine sends to the database to retrieve data when processing the logical query. The system can create a query execution debugger file that includes a record metadata portion or section, and a data portion or section, and which can be used to review, simulate, or debug the processing of queries against the database.

BRIEF DESCRIPTION OF THE DRAWINGS

FIG. 6 illustrates an example use of a query execution debugger, in accordance with an embodiment.

FIG. 7A illustrates an example use of a query execution debugger, in accordance with an embodiment.

FIG. 7B further illustrates an example use of a query execution debugger, in accordance with an embodiment.

FIG. 8 illustrates an example use of a query execution debugger, in accordance with an embodiment.

FIG. 9 illustrates an example use of a query execution debugger, in accordance with an embodiment.

FIG. 10 illustrates an example use of a query execution debugger, in accordance with an embodiment.

FIG. 11A illustrates an example use of a query execution debugger, in accordance with an embodiment.

FIG. 11B further illustrates an example use of a query execution debugger, in accordance with an embodiment.

FIG. 12 illustrates an example use of a query execution debugger, in accordance with an embodiment.

DETAILED DESCRIPTION

Figure 1:
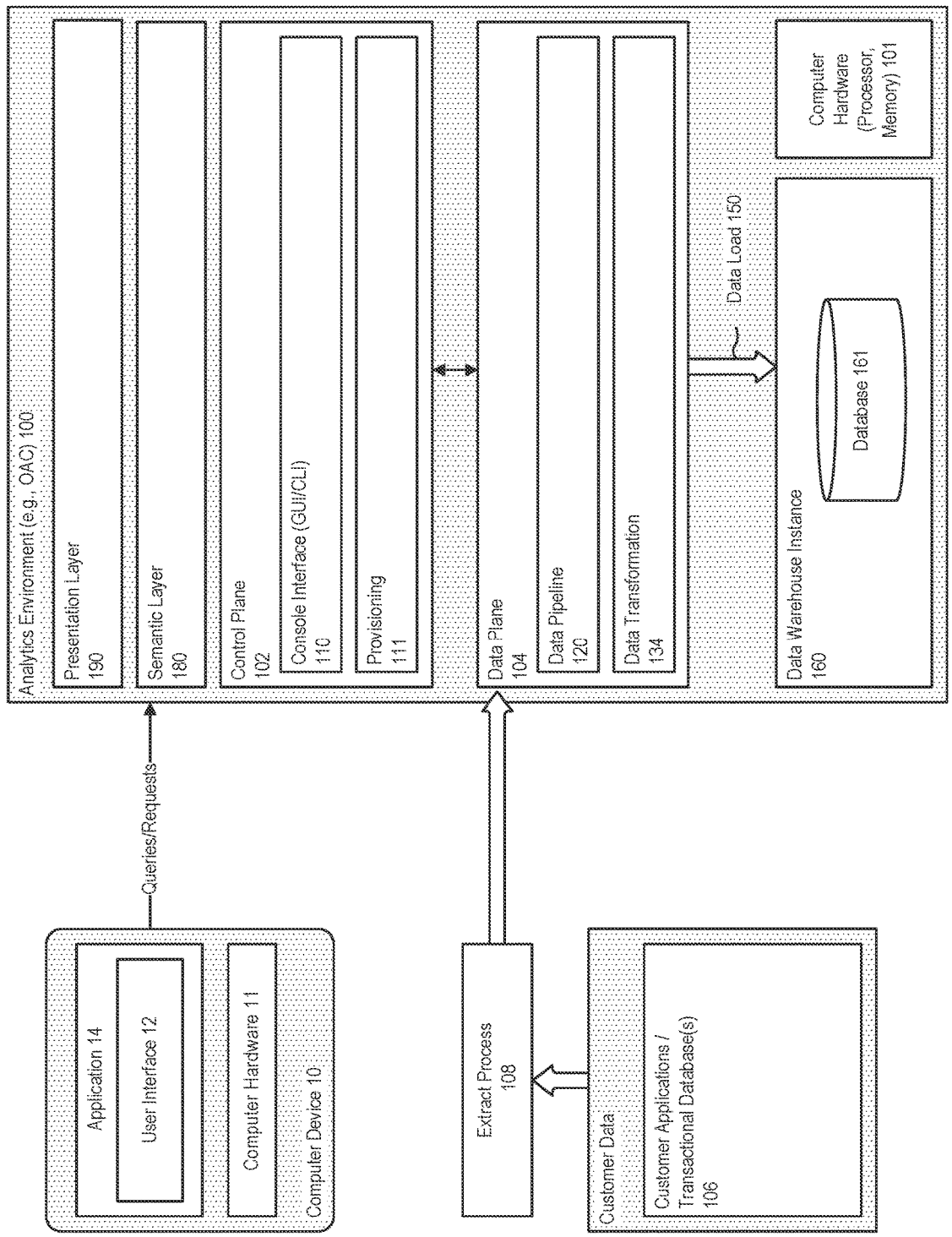
FIG. 1 illustrates an example analytics environment, in accordance with an embodiment.
Figure 2:
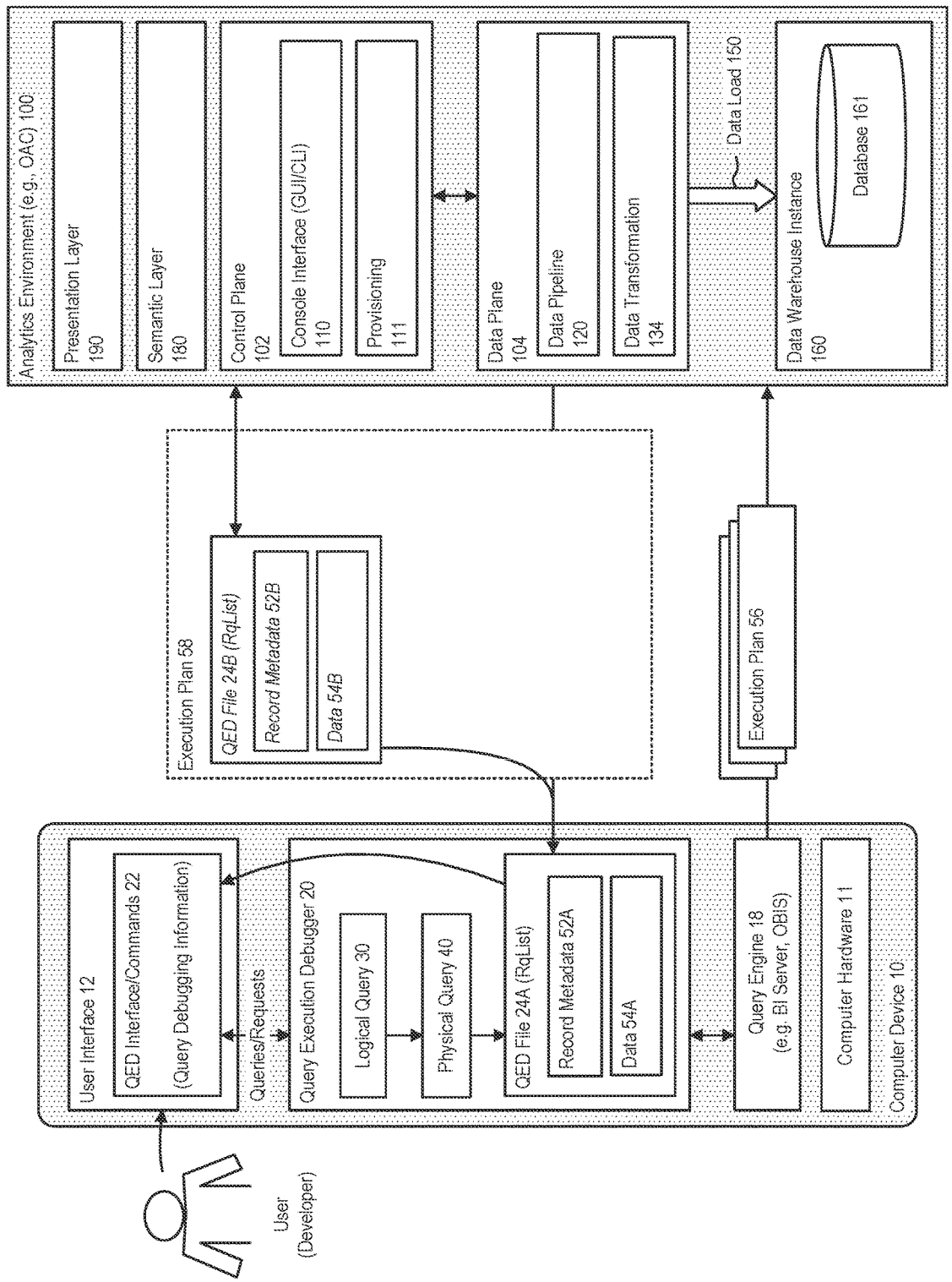
FIG. 2 illustrates a query execution debugger for use with a data analytics or business intelligence environment, in accordance with an embodiment.
Figure 3:
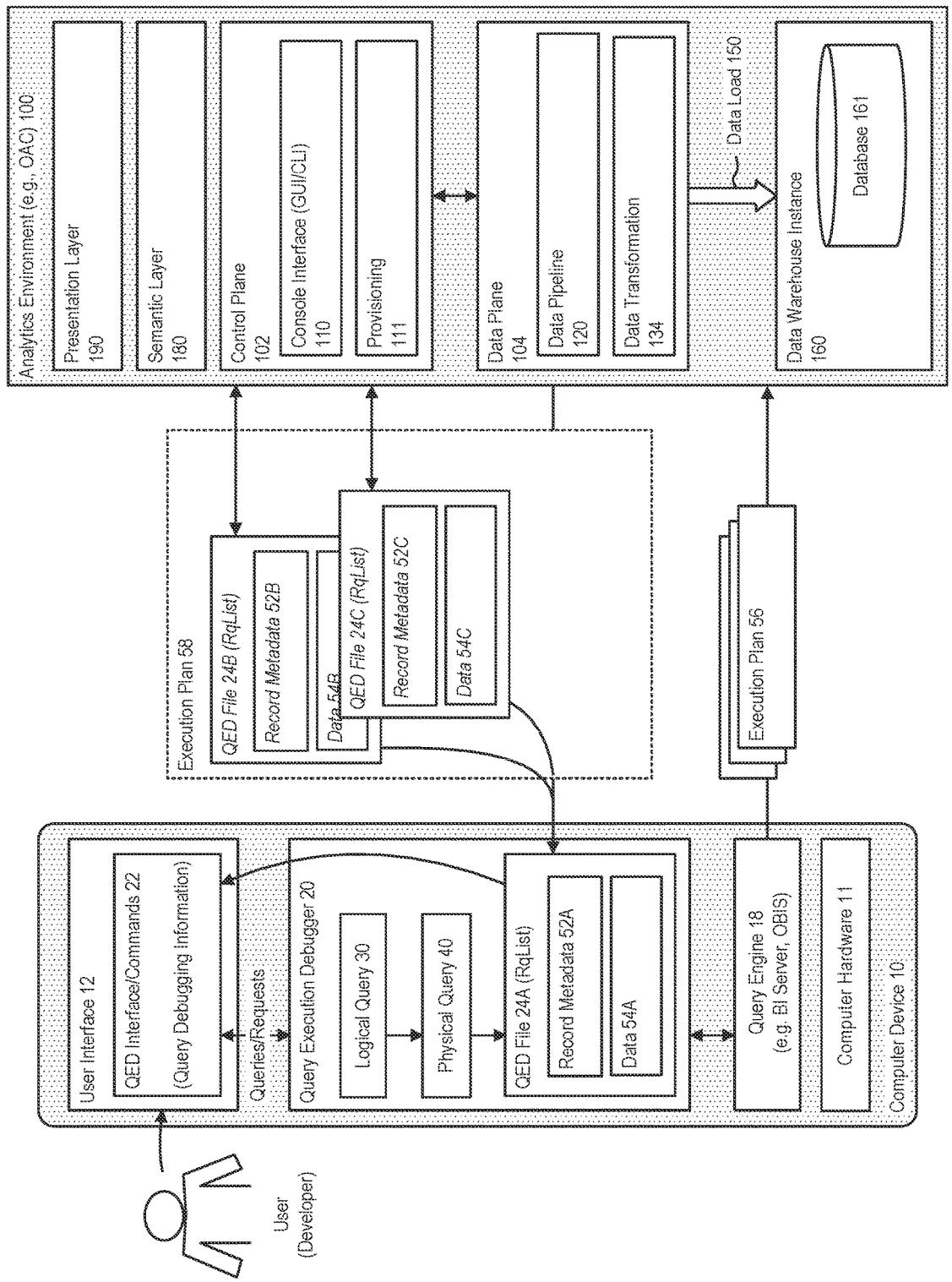
FIG. 3 further illustrates a query execution debugger for use with a data analytics or business intelligence environment, in accordance with an embodiment.
Figure 4:
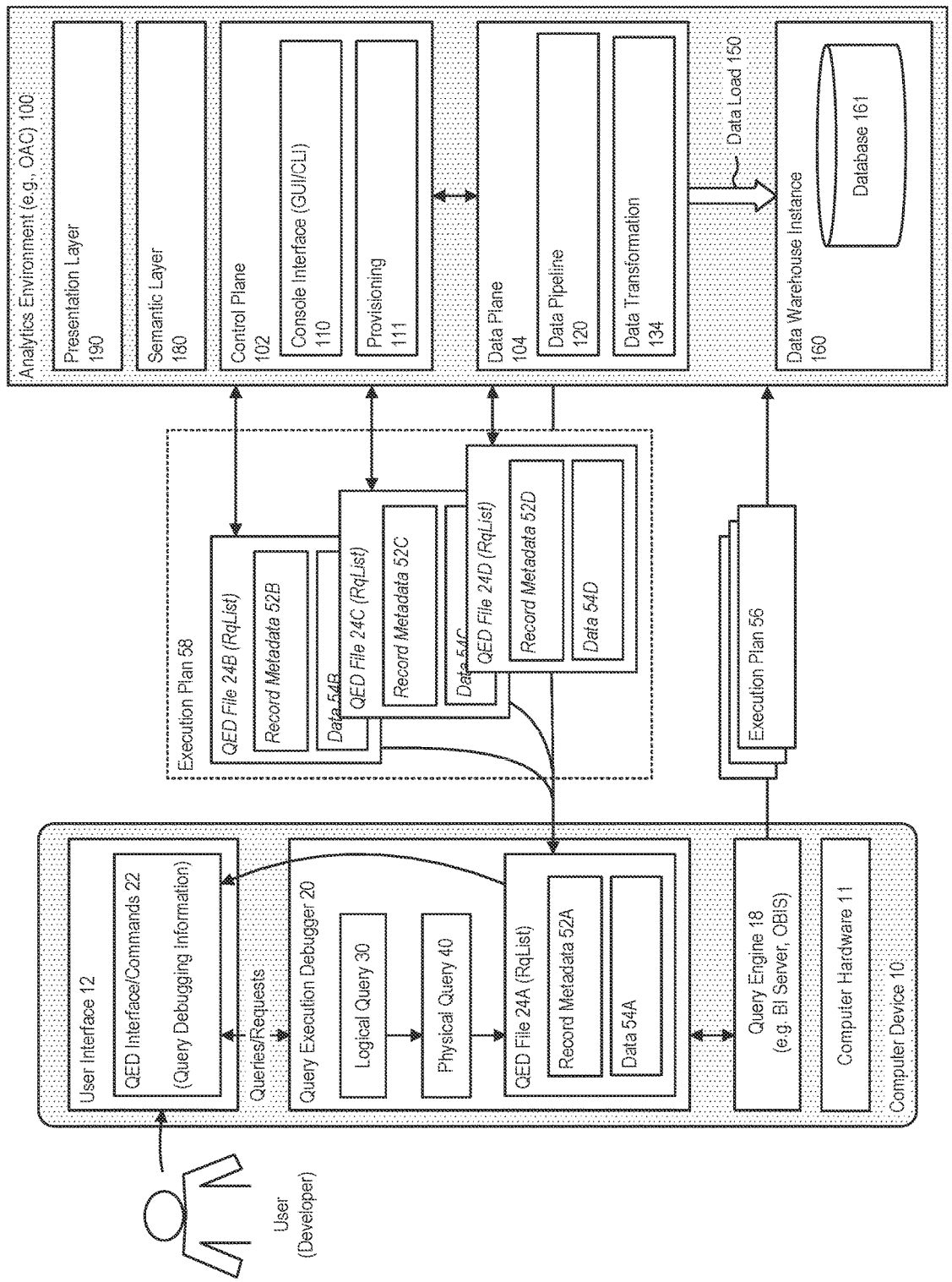
FIG. 4 further illustrates a query execution debugger for use with a data analytics or business intelligence environment, in accordance with an embodiment.
Figure 5:
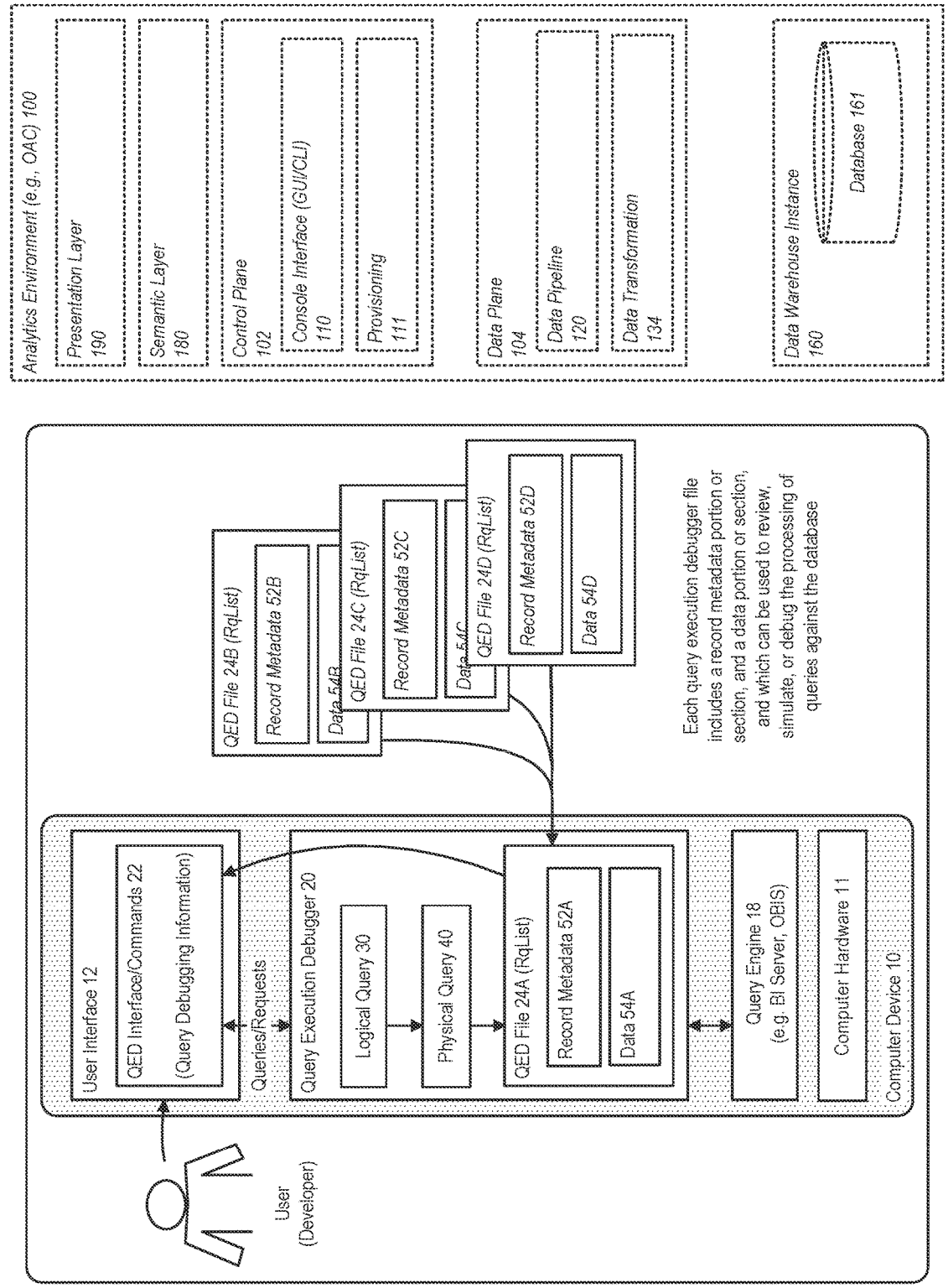
FIG. 5 further illustrates a query execution debugger for use with a data analytics or business intelligence environment, in accordance with an embodiment.

Generally described, within an organization, data analytics enables the computer-based examination or analysis of large amounts of data, in order to derive conclusions or other information from that data; while business intelligence tools (BI) provide an organization's business users with information describing their enterprise data in a format that enables those business users to make strategic business decisions. Examples of such business intelligence tools/servers include Oracle Business Intelligence Server (OBIS), which provides a query, reporting, and analysis server that can operate with a database to support features such as data mining or analytics, and analytic applications.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

In accordance with an embodiment, described herein is a query execution debugger, for use with a computing environment such as, for example, a business intelligence environment, database, data warehouse, or other type of environment that supports data analytics.

In accordance with an embodiment, a query engine, for example an OBIS instance, serves analytics queries or requests from clients, directed to data stored at a database, in accordance with a query execution plan, wherein a logical query can include Structured Query Language (SQL) statements received from the clients; while a physical query includes database-specific statements that the query engine sends to the database to retrieve data when processing the logical query. The system can create a query execution debugger (QED) file that includes a record metadata portion or section, and a data portion or section, and which can be used to review, simulate, or debug the processing of queries against the database.

Enterprise Data Analytics

In accordance with an embodiment, an analytics environment enables data analytics within the context of an organization's enterprise software application or data environment, or a software-as-a-service or other type of cloud environment; and supports the development of computer-executable software analytic applications.

For example, in accordance with an embodiment, a data warehouse environment or component, such as an Oracle Autonomous Data Warehouse (ADW), Oracle Autonomous Data Warehouse Cloud (ADWC), or other type of database or data warehouse environment or component adapted to store large amounts of data, can provide a central repository for storage of data collected by one or more business applications.

In accordance with an embodiment, the data warehouse environment or component can be provided as a multi-dimensional database that employs online analytical processing (OLAP) or other techniques to generate business-related data from multiple different sources of data.

In accordance with an embodiment, the analytic applications environment allows customers (tenants) to develop computer-executable software analytic applications for use with a BI component, such as, for example, an Oracle Business Intelligence Applications (OBIA) environment, or other type of BI component adapted to examine large amounts of data sourced either by the customer (tenant) itself, or from multiple third-party entities. As another example, an analytics environment can be used to pre-populate a reporting interface of a data warehouse instance with relevant metadata describing business-related data objects in the context of various business productivity software applications, for example, to include predefined dashboards, key performance indicators (KPIs), or other types of reports.

FIG. 1 illustrates an example analytics environment, in accordance with an embodiment.

The example shown and described in FIG. 1 is provided for purposes of illustrating an example of one type of data analytics environment that can utilize a query execution debugger as described herein. In accordance with other embodiments and examples, the query execution debugger approach described herein can be used with other types of data analytics, database, or data warehouse environments.

As illustrated in FIG. 1, in accordance with an embodiment, an analytics environment 100 can be provided by, or otherwise operate at, a computer system having a computer hardware (e.g., processor, memory) 101, and including one or more software components operating as a control plane 102, and a data plane 104, and providing access to a data warehouse, data warehouse instance 160 (database 161).

In accordance with an embodiment, the components and processes illustrated in FIG. 1, and as further described herein with regard to various other embodiments, can be provided as software or program code executable by a computer system or other type of processing device. For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example, an Oracle Analytics Cloud or Oracle Cloud Infrastructure environment, or other type of cloud environment. For example, in accordance with an embodiment, the control plane can include a console interface 110 that enables access by a client computer device 10 having a device hardware 12, application 14, and user interface 16, under control of a customer (tenant) and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse. In accordance with an embodiment, the data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Different customers of a data analytics environment may have different requirements with regard to how their data is classified, aggregated, or transformed, for purposes of providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, the presentation layer can enable access to the data content using, for example, a software analytic application, user interface, dashboard, key performance indicators (KPI's); or other type of report or interface as may be provided by products such as, for example, Oracle Analytics Cloud, or Oracle Analytics for Applications.

Business Intelligence Server

As described above, data analytics enables the computer-based examination or analysis of large amounts of data, in order to derive conclusions or other information from that data; while business intelligence tools (BI) provide an organization's business users with information describing their enterprise data in a format that enables those business users to make strategic business decisions. Examples of such business intelligence tools/servers include Oracle Business Intelligence Server (OBIS), which provides a query, reporting, and analysis server that can operate with a database to support features such as data mining or analytics, and analytic applications.

In accordance with an embodiment, a BI server such as OBIS generally operates to process inbound, e.g., SQL, requests against a database model, build and execute one or more physical database queries, process the data appropriately, and then return the data in response to the request.

To accomplish this, in accordance with an embodiment, the BI server can include various components or features, such as a logical or business model or metadata that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, a BI server may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, during operation the BI server can create a query execution plan which can then be further optimized, for example to perform aggregations of data necessary to respond to a request. Data can be combined together and further calculations applied, before the results are returned to the calling application, for example via the ODBC interface.

In accordance with an embodiment, a complex, multi-pass request that requires multiple data sources may require the BI server to break the query down, determine which sources, multi-pass calculations, and aggregates can be used, and generate the logical query execution plan spanning multiple databases and physical SQL statements, wherein the results can then be passed back, and further joined or aggregated by the BI Server.

Query Execution Debugger

At times there may be an interest in reviewing the performance by which various queries, for example as may be received from data analytics clients, are processed or otherwise receive data from a database or a data warehouse. However, direct access to the database or the data may not be provided, for example if the database is located at a customer's site, or if access to the database is otherwise restricted.

In accordance with an embodiment, described herein is a query execution debugger, for use with a computing environment such as, for example, a business intelligence (BI) environment, database, data warehouse, or other type of environment that supports data analytics.

In accordance with an embodiment, a query engine, for example an Oracle Business Intelligence Server (OBIS) instance, serves analytics queries or requests from clients, directed to data stored at a database, in accordance with a query execution plan, wherein a logical query can include Structured Query Language (SQL) statements received from the clients; while a physical query includes database-specific statements that the query engine sends to the database to retrieve data when processing the logical query. The system can create a query execution debugger (QED) file that includes a record metadata portion or section, and a data portion or section, and which can be used to review, simulate, or debug the processing of queries against the database.

FIGS. 2-5 illustrates a query execution debugger for use with a data analytics or business intelligence environment, in accordance with an embodiment.

As illustrated in FIGS. 2-5, in accordance with an embodiment, a query engine 18 (e.g., OBIS) operates in the manner of a federated query engine to serve analytical queries within, e.g., an Oracle Analytics Cloud environment, via SQL, pushes down operations to supported databases, and translates business user queries into appropriate database-specific query languages (e.g., Oracle SQL, SQL Server SQL, DB2 SQL, or Essbase MDX). The query engine (e.g., OBIS) also supports internal execution of SQL operators that cannot be pushed down to the databases.

In accordance with an embodiment, a user/developer can interact with a client computer device 10 that includes a computer hardware 11 (e.g., processor, storage, memory), user interface 12, and query execution debugger system or component 20 that enables execution of a query execution debugger interface or commands 22.

In accordance with an embodiment, the query engine (e.g., OBIS) serves analytics queries or requests from clients, directed to data stored at a database, in accordance with a query execution plan, or data warehouse. A logical query includes Structure Query Language (SQL) statements received from the client; while a physical query includes database-specific SQL statements that the query engine sends to the database to retrieve data when processing the logical query.

In accordance with an embodiment, a logical query 30 is the SQL that the query engine (e.g., OBIS) receives from clients.

In accordance with an embodiment, a physical query 40 is the database-specific SQL that the query engine (e.g., OBIS) sends to databases, to retrieve data when processing the logical query.

In accordance with an embodiment, a query execution debugger (QED) file 24 can be created, that includes a record metadata portion or section 52, and a data portion or section 54, and which can be used in combination with the query execution debugger to review, simulate, or otherwise debug the processing of queries against the database.

In accordance with an embodiment, the query engine (e.g., OBIS) generally processes queries against a database according to a query execution plan 56, that can include various child (leaf) nodes, generally referred to herein in various embodiments as RqLists, and produces one or more diagnostic log entries.

In accordance with an embodiment, within a query execution plan, each execution plan component (RqList) represents a block of query in the query execution plan, and generally translates to a SELECT statement. An RqList may have nested child RqLists, similar to how a SELECT statement can select from nested SELECT statements.

In accordance with an embodiment, when the query execution debugger is used to debug a query execution plan against a database, each QED file, including its record metadata portion or section, and its data portion or section, represents an intermediate result associated with the query execution plan as it executes its plan components (RqLists).

For example, at a particular point of an execution plan the QED file can include a record metadata or description of the data type, nullability, row description, or other information; while the data portion or section includes an associated (sample of) data, for example rows of data.

In accordance with an embodiment, a separate QED file can be generated for each RqList defined by a query execution plan. For example, as illustrated in FIGS. 2-5, a particular query execution plan 58 having multiple RqLists can be associated with multiple QED files (24B, 24C, 24D), each having a record metadata portion or section, and a data portion or section, as described above, and each representing an intermediate result associated with the query execution plan as it executes its RqLists.

In accordance with an embodiment, the described approach can be used, for example, to support the following features:

(1) Enable a developer (e.g., OBIS developer) to visualize full or partial intermediate results at specific parts of a query execution tree. For example, to debug a join execution issue, the developer may want to inspect the immediate input data from both sides of the join. The query execution debugger also provide an educational tool for new developers who are unfamiliar with OBIS internals.

(2) Enable a developer to modify intermediate results at specific parts of a query execution tree. For example, to quickly test out hypotheses while debugging, the developer may want to replace certain values in the intermediate results, re-run the query, and see if the final query results is satisfactory assuming the updated intermediate results is used.

(3) Enable a developer to easily plug in input test data in place of any data source. For example, the developer may have access to results from a customer's physical query, but not the customer's database. The physical query's results can be used to simulate a working query, despite the lack of a working database connection, which allows one to make progress when investigating production issues.

In accordance with various embodiments, additional features and advantages of various embodiments are described in further detail below.

1. Logging of Record Metadata and Data at Query Execution Plan Components

As described above, in accordance with an embodiment, a query execution debugger file can be created, that includes a record metadata portion or section, and a data portion or section, and which can be used in combination with the query execution debugger to review, simulate, or otherwise debug the processing of queries against the database.

Record metadata: In accordance with an embodiment, the record metadata portion or section of a QED file is a human-readable, marshalled form of a record metadata object. The record metadata describes the structure of all records interpreted at a particular point in the execution tree, e.g., the number of columns, column's data type, length, nullability. Each QED file generally contains only one record metadata. At a particular point in the execution tree, the in-memory record is either in fixed-length format or variable-length format, but not both. The system can log the record format once in the QED file. This will be useful when there is a need to unmarshal the logged data back into memory.

Data: In accordance with an embodiment, the system supports logging data received from the database in response to a query in a comma-separated value (CSV) format, for use as a data portion or section of a QED file. In this CSV format, nulls and empty strings must be distinguishable. Variable-length columns such as varchar, longvarchar, varbinary, longvarbinary can optionally have their length value (first 4 bytes of the column payload) logged as prefix to their values. Each line in the QED file represents one record. Data must be logged in the same CSV format regardless of the in-memory record format.

In accordance with other embodiments, the system can support logging the data in raw binary or another format. Use of a raw binary format would reflect the exact in-memory format of the record and may be useful to simulate bugs that occur at the byte-level.

2. Logging Multiple Files at Each Query Execution Plan Component

In accordance with an embodiment, each RqList may include execution of multiple sub-operations. Hence multiple files may need to be logged at each RqList.

FIG. 6 (also provided as Example 1 below), illustrates an example query execution plan, in accordance with an embodiment.

For example, in the illustrated query execution plan, a first RqList <<1501>> logs one file, which represents the data retrieved from the source; while another RqList <<1511>> logs three files: wherein one file represents the pre-aggregation records, one file represents the sort-aggregation records, and one file represents the post-aggregation records.

```
RqList <<1511>> [for database 0:0,0]
   D1.c1 as c1 [for database 0:0,0],
   sum(D1.c2 by [D1.c1]) as c2 [for database 0:0,0]
Child Nodes (RqJoinSpec): <<1523>> [for database 0:0,0]
   RqJoinNode <<1522>> [ ]
   (
      RqList <<1501>> [for database 0:0,128]
         T2000001.rental_city_dictkey as c1 [for database 0:0,128],
         T2000001.total_bookings as c2 [for database 0:0,128]
      Child Nodes (RqJoinSpec): <<1510>> [for database 0:0,128]
         RqJoinNode <<1509>> [ ]
            XC_INTERNAL_STORAGE.XC_BIKERENTALS_INPUT2950259205 T2000001
   ) as D1
GroupBy: [D1.c1] [for database 0:0,0] sort
OrderBy: c1, Aggs:[sum(D1.c2 by [D1.c1])] [for database 0:0,0]
```

Example 1

3. Logging of Specific Query Execution Plan Components

In accordance with an embodiment, there are many RqLists nodes in a complex logical query. The capability to filter by RqList nodes enables the system to reduce the amount of data that is written into QED files.

In accordance with an embodiment, RqList list identifiers (IDs) can be generated randomly (in the above example the RqLists generated are 1511 and 1501).

Alternatively, in accordance with an embodiment, a separate deterministic ID can be used, as illustrated in FIGS. 7A/7B and provided as Example 2 below, in square brackets as, e.g., [1], [2], [3], [4], [6], [7]), so that each time the user runs the debugger, the RqList is the same across multiple runs. One approach to providing a deterministic ID is to use a preorder traversal ordering index as the ID. This ID can be logged by default in an "Query execution plan:" query log entry.

For example, in accordance with an embodiment, at each RqList or RqList-like node (e.g. InnerJoin, LeftOuterJoin), the ID (shown here in square brackets) can be used to capture a deterministic ID from 1 to 20. This ID can be used for specifying the debugging configuration described later.

4. Logging of Specific Column Data for a Query Execution Plan Component

In accordance with an embodiment, intermediate RqLists may select many columns, and logging all columns may make the data file difficult for the user/developer to analyze (since the columns can be very wide). The capability to filter by column within an RqList enables the system to reduce the amount of data that is logged (and assist the user in visualizing the columns).provided below, further illustrates an example query execution plan, in accordance with an embodiment.

For example, in the illustrated extract/portion of a query execution plan (which has been formatted here for readability), a developer may only want to see the data in the third column (D901.c6 as c4) and the fourth column (D901.c7 as c5) at RqList <<10225>>. To do so, the developer can specify the RqList ID 6 and the column numbers 3, 4 in their debugging configuration. Column numbers start from 1 and indicate the ordering of the columns under an RqList. When column-level filters are specified, the record metadata as described above can continue to be logged in full, i.e., all columns' metadata should be logged. The QED file can clearly indicate which specific column's data are getting logged using the column numbers described in the previous paragraph.

```
RqList <<9722>> [for database 0:0,0] [1]
   D1.c1 as c1 [for database 0:0,0],
   D1.c2 as c2 [for database 0:0,0],
   D1.c3 as c3 [for database 0:0,0],
   D1.c4 as c4 [for database 0:0,0],
   D1.c5 as c5 [for database 0:0,0],
   D1.c6 as c6 [for database 0:0,0],
   D1.c7 as c7 [for database 0:0,0]
Child Nodes (RqJoinSpec): <<9741>> [for database 0:0,0]
   RqJoinNode <<9740>> [ ]
   (
      Child Nodes (RqCache): 1594825038:105:1615788485:0x7f949888e7d0
         RqList <<8602>> [for database 0:0,0] [2]
            0 as c1 GB [for database 0:0,1],
            D106.c1 as c2 GB [for database 0:0,0],
            Dict_lookup(D106.c2, XC_INTERNAL_STORAGE.XC_CITYCABS_50MB_INPU462464504
                (Dictionary for vendor_id)) as c3 GB [for database 0:0,0],
            D106.c3 as c4 GB [for database 0:0,0],
            D106.c4 as c5 GB [for database 0:0,0],
            D106.c5 as c6 GB [for database 0:0,0],
            D106.c6 as c7 GB [for database 0:0,0],
            cast(NULL as VARCHAR (192)) as c8 [for database 0:0,1],
            cast(NULL as VARCHAR (192)) as c9 [for database 0:0,1]
         Child Nodes (RqJoinSpec): <<9534>> [for database 0:0,0]
            RqJoinNode <<9533>> [ ]
            (
               RqList <<9465>> [for database 0:0,0] [3]
                  D901.c1 as c1 GB [for database 0:0,0],
                  D901.c2 as c2 GB [for database 0:0,0],
                  coalesce(D901.c3 , D901.c4) as c3 GB [for database 0:0,0],
                  sum(D901.c5 by [D901.c1, D901.c2, coalesce(D901.c3 , D901.c4)])
                     as c4 GB [for database 0:0,0],
                  sum(D901.c6 by [D901.c1, D901.c2, coalesce(D901.c3 , D901.c4)])
                     as c5 GB [for database 0:0,0],
                  sum(D901.c7 by [D901.c1, D901.c2, coalesce(D901.c3 , D901.c4)])
                     as c6 GB [for database 0:0,0]
               Child Nodes (RqJoinSpec): <<9760>> [for database 0:0,0]
                  RqJoinNode <<9812>> [ ]
                  (
                     RqList <<9770>> [for database 0:0,0] [4]
                        D102.c1 as c1 GB [for database 0:0,0],
                        D102.c2 as c2 GB [for database 0:0,0],
                        D101.c1 as c3 GB [for database 0:0,0],
                        D102.c3 as c4 GB [for database 0:0,0],
                        D102.c4 as c5 [for database 0:0,0],
                        D102.c5 as c6 [for database 0:0,0],
                        D102.c6 as c7 [for database 0:0,0]
                     Child Nodes (RqJoinSpec): <<9773>> [for database 0:0,0]
                        RqJoinNode <<9769>> [ ]
                        (
                           RqList <<10383>> [for database 0:0,0] [6]
                              Dict_lookup(D1.c9,
                                 XC_INTERNAL_STORAGE.XC_CITYCABS_50MB_INPU462464504
                                 Dictionary for hack_license)) as c3 [for database 0:0,0],
                              D1.c1 as c1 [for database 0:0,0],
                              D1.c2 as c2 [for database 0:0,0],
                              D1.c4 as c4 [for database 0:0,0],
                              D1.c5 as c5 [for database 0:0,0],
                              D1.c6 as c6 [for database 0:0,0]
                           Child Nodes (RqJoinSpec): <<10410>> [for database 0:0,0]
                              RqJoinNode <<10409>> [ ]
                              (
                                 RqList <<10225>> [for database 0:0,0] [7]
                                    D901.c1 as c1 [for database 0:0,0],
                                    D901.c4 as c2 [for database 0:0,0],
                                    D901.c6 as c4 [for database 0:0,0],
```

```
    D901.c7 as c5 [for database 0:0,0],
    D901.c5 as c6 [for database 0:0,0],
    D901.c2 as c9 [for database 0:0,0]
...
```

Example 2

5. Logging of Filtered Rows for a Query Execution Plan Component

In accordance with an embodiment, a developer may be interested in analyzing certain rows produced from an RqList. The capability to filter rows for an RqList enables the system to reduce the amount of data that is written into the QED files. The filter specification can support simple comparison operators, i.e., ==, !=, <, <=, >, >=, IN(list). The string value from the filter specification can ideally be converted to the corresponding column data type before applying the filter. Equality comparison of null values can be supported. The filter specification can support multiple filter conditions, and these conditions will be ANDed. Filtering is applied during logging time and should not affect the output of the query.

6. Informative File Names for Query Execution Plan Components

In accordance with an embodiment, the file name for each RqList can self-describe the logged data. This helps to categorize and sort the collected files in a logical way, especially when there are multiple queries running concurrently in the server. For example, a proposed naming scheme can be:

QED<logicalrequesthash><deterministicRqListID>
    <nondeterministicR
    qListID><optionalsuboperationname>.txt For example, QED_4f291791_0003_9465_preaggr.txt. The deterministic RqList ID can be padded with 0 up to 4 digits to help with file name sorting. In the example above, the deterministic RqList ID is 3, so it is converted to 0003.

7. Unmarshalling of Logged Metadata and Data at Query Execution Plan Components In accordance with an embodiment, the logging specification can support the use of a QED file as a source of data at a specific RqList, as an override. This replaces the original data-producing execution path that is upstream from this RqList. Here "upstream" refers to the query execution plan below this RqList in the query execution plan that is logged in the OBIS query log. When the logical query is run with this logging specification:

(a) The query execution plan that is logged in the query log remains the same. This enables the system to keep the deterministic RqList ID stable by ensuring that the query tree structure is the same as before.

(b) During the execution phase, the relevant execution operator for the RqList should produce data by unmarshalling the logged metadata and data from the specified file, instead of reading from its child list stream or its remote data source. One approach is to use a QED execution operator that implements the list stream interface. The record format produced by the operator (fixed-length vs. variable-length) depends on the metadata logged in the QED file.

(c) Upstream execution starting from the overridden RqList should be disabled. If the upstream execution required a connection to a remote data source, it is no longer required with the override.

In accordance with an embodiment, the override is always performed in full, i.e., there is no support for overriding only specific columns in an RqList. This means that the specified QED file must contain data for all columns described in the record metadata.

8. Debugging Configuration for Logical Queries

In accordance with an embodiment, a JSON payload can be used to capture the debugging configuration. This JSON payload can then be supplied as a request variable to enable debugging for a specific logical query; for example:

SET VARIABLE OBIS_QED_CONFIG='<JSON>':
    SELECT . . . ;

FIG. 8 (also provided as Example 3 below), illustrates an example JSON payload (which has been formatted here for readability), in accordance with an embodiment.

```
{
  "directory" : "<directory_path>"
      // Absolute directory path to read or write QED files.
          If unspecified, OBIS log directory will be used.
  "node-list" : // If unspecified or empty, logging will be enabled on
      all nodes.
  [
    {
      "node-id" : "<id>", // The deterministic ID of a RqList node.
          There may be other types of loggable nodes besides RqList.
      "read-spec" : // If specified, write-spec will be ignored.
      {
        "file" : "<QED file name>", // The file to read as an override.
            It is assumed to be located in the configured directory.
        "sub-operation" : "<name of sub-operation within the node
        to override>"
            // Required if there are multiple sub-operations in the node.
      },
      "write-spec" :
      {
        "data-format" : "<format of the logged data>",
            // If unspecified, CSV format is used.
        "include-col-length-prefix" : "<true/flase>",
            // If true, variable length columns will be logged with their
            length prefix in the CSV. Default is false.
        "sub-operations" : [<array of sub-operation names to log>],
            // If unspecified or empty, all sub-operations will be logged.
        "columns" : [<array of column numbers to log>],
            // If unspecified, all columns will be logged.
            If empty, only metadata is logged.
        "data-filter" : [<array of filter conditions>]
            // If unspecified or empty, all rows will be logged.
      }
    },
    {
      // Spec for another node.
    }
  ]
}
```

Example 3

9. Windows and Linux Support

In accordance with an embodiment, the query execution debugger can be adapted to work on, e.g., Windows and Linux platforms, and the QED file can be portable between the two platforms, assuming the data is in CSV format. For example, a QED file generated on Linux can be used as an override on Windows and vice-versa.

10. Compile-Time Enablement of Query Execution Debugging

In accordance with an embodiment, the query execution debugger can be provided by means of conditional compilation; alternatively QED-enabled libraries can be used to replace original libraries without requiring the recompilation and replacement of all libraries.

Example Logical Query

FIG. 9 (also provided as Example 4 below), illustrates an example logical query, in accordance with an embodiment.

```
SELECT
    Product.CategoryName as "Category Name",
    Sales.Revenue as "Revenue",
    Sales.PlanRevenue as "Plan Revenue"
FROM SalesSubjectArea
WHERE Sales.Revenue − Sales.PlanRevenue > 20000 ORDER BY 1
```

Example 4

Example Physical Query

FIG. 10 (also provided as Example 5 below), illustrates an example physical query for the above logical query, in accordance with an embodiment.

```
Oracle database SQL 1:
select T3075.CategoryName as c2,
    T3075.CategoryID as c3,
    sum(T3145.Revenue) as c1
from
    Categories T3075,
    Products T3122,
    Suppliers T3176,
    sales_prod_emp_T3145
where (T3075.CategoryID = T3122.CategoryID and
    T3122.ProductID = T3145.ProductID and
    T3122.SupplierID = T3176.SupplierID)
group by T3075.CategoryID, T3075.CategoryName
Oracle database SQL 2:
select T3075.CategoryName as c2,
    T3075.CategoryID as c3,
    sum(T3154.Revenue) as c1
from
    Categories T3075,
    SalesPlan T3154
where (T3075.CategoryID = T3154.CategoryID)
group by T3075.CategoryID, T3075.CategoryName
```

Example 5

In accordance with an embodiment, the data returned from both physical queries are joined (e.g., in OBIS) to produce the result for the logical query.

FIGS. 11A/11B (also provided as Example 6 below), illustrates an example query execution plan for the logical query shown and described above (which has been formatted here for readability), in accordance with an embodiment.

```
RqList <<38734>> [for database 0:0,0] [1]
    D1.c1 as c1 [for database 3023:3036:SQLDB_Northwind,46],
    D1.c2 as c2 [for database 3023:3036:SQLDB_Northwind,46],
    D1.c3 as c3 [for database 3023:3036:SQLDB_Northwind,46]
Child Nodes (RqJoinSpec): <<38747>> [for database 0:0,0]
    RqJoinNode <<38746>> [ ]
    (
        RqBreakFilter <<38902>> [1,4] [for database 0:0,1] [2]
        RqList <<38790>> [for database 0:0,0] [3]
            coalesce(D1.c2 , D2.c2) as c1 GB
                [for database 3023:3036:SQLDB_Northwind,46],
            coalesce(D1.c3 , D2.c3) as c4 GB
                [for database 3023:3036:SQLDB_Northwind,46],
            D1.c1 as c2 GB [for database 3023:3036:SQLDB_Northwind,46],
            D2.c1 as c3 GB [for database 3023:3036:SQLDB_Northwind,46]
        Child Nodes (RqJoinSpec): <<38793>> [for database 0:0,0]
            RqJoinNode <<38789>> [ ]
            (
                RqList <<38571>> [for database 3023:3036:SQLDB_Northwind,46] [5]
                    Categories.CategoryName as c2 GB
                        [for database 3023:3036:SQLDB_Northwind,46],
                    Categories.CategoryID as c3 GB
                        [for database 3023:3036:SQLDB_Northwind,46],
                    sum(sales_prod_emp.Revenue by [Categories.CategoryID]) as c1 GB
                        [for database 3023:3036:SQLDB_Northwind,46]
                Child Nodes (RqJoinSpec) : <<38637>>
                    [for database 3023:3036:SQLDB_Northwind,46]
                    RqJoinNode <<38633>> [(InNode:<<38633>>) (OutNode:<<38634>>)]
                        Categories T3075
                    RqJoinNode <<38634>> [(InNode:<<38633>>) (OutNode:<<38634>>) ,
                        (InNode:<<38634>>) (OutNode:<<38 635>>) , (InNode:<<38634>>)
                        (OutNode:<<38636>>)]
                        Products T3122
                    RqJoinNode <<38635>> [(InNode:<<38634>>) (OutNode:<<38635>>)]
                        Suppliers T3176
                    RqJoinNode <<38636>> [(InNode:<<38634>>) (OutNode:<<38636>>)]
                        sales_prod_emp T3145
                DetailFilter: Categories.CategoryID = Products.CategoryID and
                Products.ProductID = sales_prod_emp.ProductID and
                Products.SupplierID = Suppliers.SupplierID
                    [for database 3023:3036:SQLDB_Northwind,46]
                GroupBy: [Categories.CategoryID, Categories.CategoryName]
                    [for database 3023:3036:SQLDB_Northwind,46]
```

```
) as D1 FullOuterStitchJoin (Eager) <<38722>> [4]
    On D1.c2 = D2.c2 and D1.c3 = D2.c3; actual join vectors: [0 1] = [0 1]
    (
        RqList <<38646>> [for database 3023:3036:SQLDB__Northwind,46] [6]
            Categories.CategoryName as c2 GB
                [for database 3023:3036:SQLDB__Northwind,46],
            Categories.CategoryID as c3 GB
                [for database 3023:3036:SQLDB__Northwind,46],
            sum(SalesPlan.Revenue by [Categories.CategoryID]) as c1 GB
                [for database 3023:3036:SQLDB__Northwind,46]
        Child Nodes (RqJoinSpec) : <<38683>>
            [for database 3023:3036:SQLDB__Northwind,46]
            RqJoinNode <<38681>> [(InNode:<<38681>>) (OutNode:<<38682>>)]
                Categories T3075
            RqJoinNode <<38682>> [(InNode:<<38681>>) (OutNode:<<38682>>)]
                SalesPlan T3154
        DetailFilter: Categories.CategoryID = SalesPlan.CategoryID
            [for database 3023:3036:SQLDB__Northwind,46]
        GroupBy: [Categories.CategoryID, Categories.CategoryName]
            [for database 3023:3036:SQLDB__Northwind,46]
    ) as D2
    DetailFilter: 20000 < D1.c1 - D2.c1 [for database 3023:3036:SQLDB__Northwind,46]
    OrderBy: c1 asc, c4 [for database 0:0,0]
) as D1
```

Example 6

FIG. 12 (also provided as Example 7 below), illustrates an example QED file for the query execution plan above, in accordance with an embodiment.

```
]
"consumeVariableLengthRecord": false,
"produceVariableLengthRecord": false,
"binaryRecordSize": 64,
"textRecordSize": 62,
"fieldCount": 3,
"nullIndicatorCount": 3,
"nullsOffset": 56,
"isUnicodeCharacter": true,
"fieldDescriptors": [
    {
        "dataTypeName": "VARCHAR",
        "fieldId": 0,
        "objectLength": 15,
        "byteOffset": 0,
        "nullOffset": 56,
        "textOffset": 0,
        "textLength": 15,
        "decimalPrecision": 2,
        "scale": 0
    },
    {
        "dataTypeName": "DOUBLE PRECISION",
        "fieldId": 1,
        "objectLength": 8,
        "byteOffset": 40,
        "nullOffset": 57,
        "textOffset": 16,
        "textLength": 22,
        "decimalPrecision": 2,
        "scale": 0
    },
    {
        "dataTypeName": "DOUBLE PRECISION",
        "fieldId": 2,
        "objectLength": 8,
        "byteOffset": 48,
        "nullOffset": 58,
        "textOffset": 39,
        "textLength": 22,
        "decimalPrecision": 2,
        "scale": 0
    }
]
```

```
}
Beverages,286526.95,257874.27
Dairy Products,251330.5,226197.45
```

Example 7

Query Execution Debugging Example

In accordance with an embodiment, the following example provides an illustrative example use of the query execution debugger in combination with one or more QED files, to review, simulate, or otherwise debug the processing of queries against the database.

(1) In this example, the logical query above returned two rows of data:

| | | |
|---|---|---|
| Beverages | 286,526.95 | 257,874.27 |
| Dairy Products | 251,330.50 | 226,197.45 |

However, according to the customer, it should have returned an additional row:

| | | |
|---|---|---|
| Condiments | 113,694.75 | 92,111.30 |

(2) After deploying the query execution debugger in the customer's environment, QED files are collected by running this logical query:

```
SET VARIABLE OBIS_QED_CONFIG='{ }':
SELECT
    Product.CategoryName as "Category Name",
    Sales.Revenue as "Revenue",
    Sales.PlanRevenue as "Plan Revenue"
FROM SalesSubjectArea
WHERE Sales.Revenue - Sales.PlanRevenue > 20000 ORDER BY 1
```

For example, a QED file named QED_DBGateway.txt and associated with RqList <<38646>> can be represented as:

```
{
    "consumeVariableLengthRecord": false,
    "produceVariableLengthRecord": false,
    "binaryRecordSize": 64,
    "textRecordSize": 96,
    "fieldCount": 3,
    "nullIndicatorCount": 1,
    "nullsOffset": 56,
    "isUnicodeCharacter": true,
    "fieldDescriptors": [
        {
            "dataTypeName": "VARCHAR",
            "fieldId": 0,
            "objectLength": 15,
            "byteOffset": 0,
            "nullOffset": 0,
            "textOffset": 0,
            "textLength": 15,
            "decimalPrecision": 0,
            "scale": 0
        },
        {
            "dataTypeName": "DOUBLE PRECISION",
            "fieldId": 1,
            "objectLength": 8,
            "byteOffset": 40,
            "nullOffset": 0,
            "textOffset": 16,
            "textLength": 58,
            "decimalPrecision": 38,
            "scale": 0
        },
        {
            "dataTypeName": "DOUBLE PRECISION",
            "fieldId": 2,
            "objectLength": 8,
            "byteOffset": 48,
            "nullOffset": 56,
            "textOffset": 75,
            "textLength": 20,
            "decimalPrecision": 0,
            "scale": 0
        }
    ]
}
Confections,3.0,159389.19
Seafood,8.0,127460.79
Beverages,1.0,257874.27
Produce,7.0,94741.75
Dairy Products,4.0,226197.45
Grains/Cereals,5.0,90654.13
Condiments,2.0,102325.28
Meat/Poultry,6.0,160369.92
```

(3) In this example, it is observed in QED_DBGateway.txt associated with RqList <<38646>> that the row for "Condiments" has the following value:

Condiments, 2.0,102325.28

As such, the user/developer may form a hypothesis: the value 102325.28 returned from the OBIS database gateway may be incorrect.

(4) To test the hypothesis, the content of QED_DBGateway.txt is copied to a new file called override.txt. In override.txt, the value 102325.28 is replaced with 92111.30. In an internal debugging environment, with the query execution debugger enabled, the logical query is re-run with overrides specified:

```
SET VARIABLE OBIS_QED+CONFIG='
{
    "node-list" :
    [
        {
            "node-id" : "5",
            "read-spec" :
            {
                "file" : "QED_DBGateway.txt",
                "sub-operation" : "DBGateway"
            },
        },
        {
            "node-id" : "6",
            "read-spec" :
            {
                "file" : "override.txt",
                "sub-operation" : "DBGateway"
            },
        }
    ]
}':
SELECT
    Product.CategoryName as "Category Name",
    Sales.Revenue as "Revenue",
    Sales.PlanRevenue as "Plan Revenue"
FROM SalesSubjectArea
WHERE Sales.Revenue – Sales.PlanRevenue > 20000 ORDER BY 1
```

(5) The logical query now returns three rows, as expected by the customer:

| Beverages | 286,526.95 | 257,874.27 |
|---|---|---|
| Dairy Products | 251,330.50 | 226,197.45 |
| Condiments | 113,694.75 | 92,111.30 |

The above result indicates that, in this example the original hypothesis is correct (i.e., the value 102325.28 returned from the OBIS database gateway is incorrect). Further debugging can now be focused on the OBIS database gateway. The use of the query execution debugger has successfully narrowed down the problematic area of the software.

Query Execution Debugging Process

Figure 13:
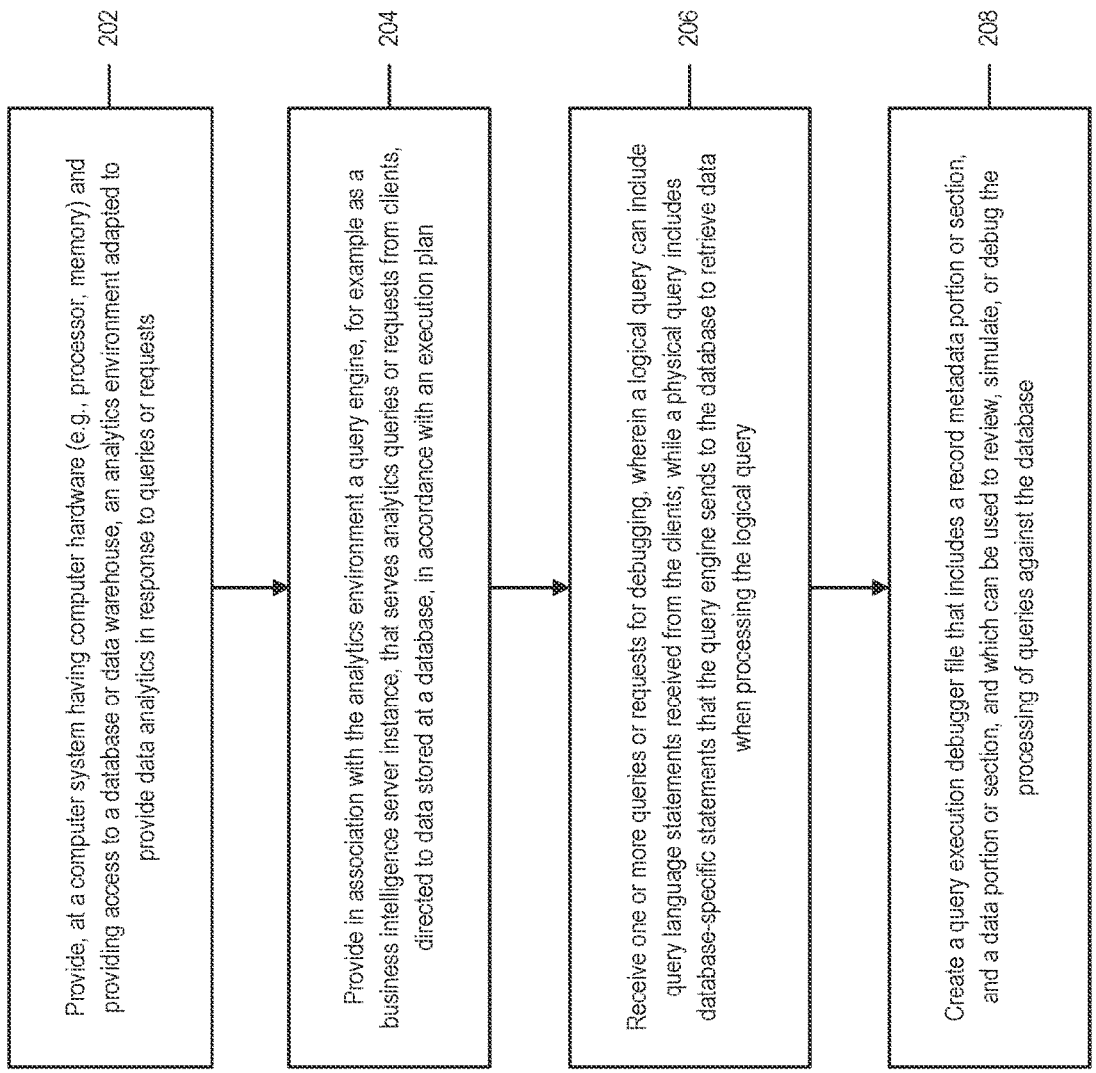
FIG. 13 illustrates a process for use of a query execution debugger with business intelligence and data analytics environments, in accordance with an embodiment.

FIG. 13 illustrates a process for use of a query execution debugger with business intelligence and data analytics environments, in accordance with an embodiment.

As illustrated in FIG. 13, in accordance with an embodiment, at step 202, a computer system having computer hardware (e.g., processor, memory) and providing access to a database or data warehouse, includes an analytics environment adapted to provide data analytics in response to queries or requests.

At step 204, a query engine is provided in association with the analytics environment, for example as a business intelligence server instance, that serves analytics queries or requests from clients, directed to data stored at a database, in accordance with a query execution plan.

At step 206, the system can receive one or more queries or requests for debugging, wherein a logical query can include query language statements received from the clients; while a physical query includes database-specific statements that the query engine sends to the database to retrieve data when processing the logical query.

At step 208, the system creates a query execution debugger file that includes a record metadata portion or section, and a data portion or section, and which can be used to review, simulate, or debug the processing of queries against the database.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of a data analytics environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing a query execution debugger for use with business intelligence and data analytics environments, comprising:
    a computer that serves analytical queries, including processing queries against a database according to query execution plans that include query execution plan components, wherein each query execution plan component is associated with one or more query statements that when executed access data at the database;
    wherein during debugging of a query execution plan associated with the database, the system creates a plurality of query execution debugger files including, for a query execution plan component of the query execution plan:
        receiving an indication of one or more filters to be used with the query execution plan component; and
        executing the query statement as filtered, to retrieve from the database a sample of data, and store the sample of data in a query execution debugger file that includes as contents stored therein:
            a record metadata portion or section, and
            a data portion or section,
            representing an intermediate result associated with the query execution plan as it executes the plan component, including a description of a data type associated with the plan component and the associated sample of data as retrieved from the database; and
    wherein the system processes the contents of a query execution debugger file in debugging the processing of the query execution plan against the database, including:
        receiving a modification to the record metadata or the sample of data as retrieved from the database and contained within the query execution debugger file; and
        processing the contents of the query execution debugger file as modified, to simulate processing of the query execution plan against the database.

2. The system of claim 1, wherein a logical query includes Structure Query Language (SQL) statements received from the client; while a physical query includes database-specific SQL statements that are sent to the database to retrieve data when processing the logical query.

3. The system of claim 1, wherein the queries are processed against the database according to a query execution plan that includes nodes, wherein each query execution debugger file, including its record metadata and data, represents an intermediate result associated with the query execution plan.

4. The system of claim 3, comprising the plurality of query execution debugger files, wherein a separate query execution debugger file is generated for each node defined by the query execution plan.

5. The system of claim 1, wherein each query execution plan component represents a block of query in the query execution plan, and one or more nested child query execution plan components.

6. The system of claim 1, wherein a query execution plan having multiple query execution plan components can be associated with multiple query execution debugger file each having a record metadata portion or section, and a data portion or section, and representing an intermediate result associated with the query execution plan as it executes its multiple query execution plan components; and
    wherein the record metadata portion or section of the query execution debugger file is a human-readable, marshalled form of a record metadata object describing a structure of records interpreted at a particular point in the execution tree.

7. The system of claim 1, wherein modification of the record metadata or the data contained within a query execution debugger file overwrites the contents originally included therein, and the query execution debugger file as modified is used to simulate processing of the query execution plan against the database.

8. The system of claim 7, wherein the query execution debugger file as modified is saved as a new debugger file and used to simulate processing of the query execution plan against the database.

9. A method for providing a query execution debugger for use with business intelligence and data analytics environments, comprising:
    receiving analytical queries for processing against a database according to query execution plans that include query execution plan components, wherein each query execution plan component is associated with one or more query statements that when executed access data at the database; and during debugging of a query execution plan associated with the database, creating, for a query execution plan component of the query execution plan, a query execution debugger file, including:

receiving an indication of one or more filters to be used with the query execution plan component; and executing the query statement as filtered, to retrieve from the database a sample of data, and store the sample of data in a query execution debugger file that includes as contents stored therein:

a record metadata portion or section, and a data portion or section, representing an intermediate result associated with the query execution plan as it executes the plan component, including a description of a data type associated with the plan component and the associated sample of data as retrieved from the database; and processing the contents of a query execution debugger file in debugging the processing of the query execution plan against the database, including:

receiving a modification to the record metadata or the sample of data as retrieved from the database and contained within the query execution debugger file; and processing the contents of the query execution debugger file as modified, to simulate processing of the query execution plan against the database.

10. The method of claim 9, wherein a logical query includes Structure Query Language (SQL) statements received from the client; while a physical query includes database-specific SQL statements that are sent to the database to retrieve data when processing the logical query.

11. The method of claim 9, wherein the queries are processed against the database according to a query execution plan that includes nodes, wherein each query execution debugger file, including its record metadata and data, represents an intermediate result associated with the query execution plan.

12. The method of claim 11, comprising the plurality of query execution debugger files, wherein a separate query execution debugger file is generated for each node defined by the query execution plan.

13. The method of claim 9, wherein each query execution plan component represents a block of query in the query execution plan, and one or more nested child query execution plan components.

14. The method of claim 9, wherein a query execution plan having multiple query execution plan components can be associated with multiple query execution debugger file each having a record metadata portion or section, and a data portion or section, and representing an intermediate result associated with the query execution plan as it executes its multiple query execution plan components; and wherein the record metadata portion or section of the query execution debugger file is a human-readable, marshalled form of a record metadata object describing a structure of records interpreted at a particular point in the execution tree.

15. The method of claim 9, wherein modification of the record metadata or the data contained within a query execution debugger file overwrites the contents originally included therein, and the query execution debugger file as modified is used to simulate processing of the query execution plan against the database.

16. The method of claim 15, wherein the query execution debugger file as modified is saved as a new debugger file and used to simulate processing of the query execution plan against the database.

17. A non-transitory computer readable storage medium having instructions thereon, which when read and executed by a computer including one or more processors cause the computer to perform a method comprising receiving analytical queries for processing against a database according to query execution plans that include query execution plan components, wherein each query execution plan component is associated with one or more query statements that when executed access data at the database; and during debugging of a query execution plan associated with the database, creating, for a query execution plan component of the query execution plan, a query execution debugger file, including:

receiving an indication of one or more filters to be used with the query execution plan component; and executing the query statement as filtered, to retrieve from the database a sample of data, and store the sample of data in a query execution debugger file that includes as contents stored therein:

a record metadata portion or section, and a data portion or section, representing an intermediate result associated with the query execution plan as it executes the plan component, including a description of a data type associated with the plan component and the associated sample of data as retrieved from the database; and processing the contents of a query execution debugger file in debugging the processing of the query execution plan against the database, including:

receiving a modification to the record metadata or the sample of data as retrieved from the database and contained within the query execution debugger file; and processing the contents of the query execution debugger file as modified, to simulate processing of the query execution plan against the database.

18. The non-transitory computer readable storage medium of claim 17, wherein a logical query includes Structure Query Language (SQL) statements received from the client; while a physical query includes database-specific SQL statements that are sent to the database to retrieve data when processing the logical query.

19. The non-transitory computer readable storage medium of claim 17, wherein the queries are processed queries against the database according to a query execution plan that includes nodes, wherein each query execution debugger file, including its record metadata and data, represents an intermediate result associated with the query execution plan.

20. The non-transitory computer readable storage medium of claim 19, comprising the plurality of query execution debugger files, wherein a separate query execution debugger file is generated for each node defined by the query execution plan.

* * * * *

UNITED STATES PATENT AND TRADEMARK OFFICE
CERTIFICATE OF CORRECTION

PATENT NO. : 12,248,464 B2
APPLICATION NO. : 17/395816
DATED : March 11, 2025
INVENTOR(S) : Eng et al.

Page 1 of 1

It is certified that error appears in the above-identified patent and that said Letters Patent is hereby corrected as shown below:

In the Specification

In Column 13, Lines 35-37, delete "QED<logicalrequesthash><deterministicRqListID><nondeterministicR qListID><optionalsuboperationname>.txt" and insert -- QED_<logical_request_hash>_<deterministic_RqList_ID>_<non_deterministic_RqList_ID>_<optional_sub_operation_name>.txt --, therefor.

In Column 14, Line 43, delete ""<true/flase>"," and insert -- "<true/false>", --, therefor.

Signed and Sealed this
Tenth Day of June, 2025

Coke Morgan Stewart
*Acting Director of the United States Patent and Trademark Office*